UNITED STATES PATENT OFFICE.

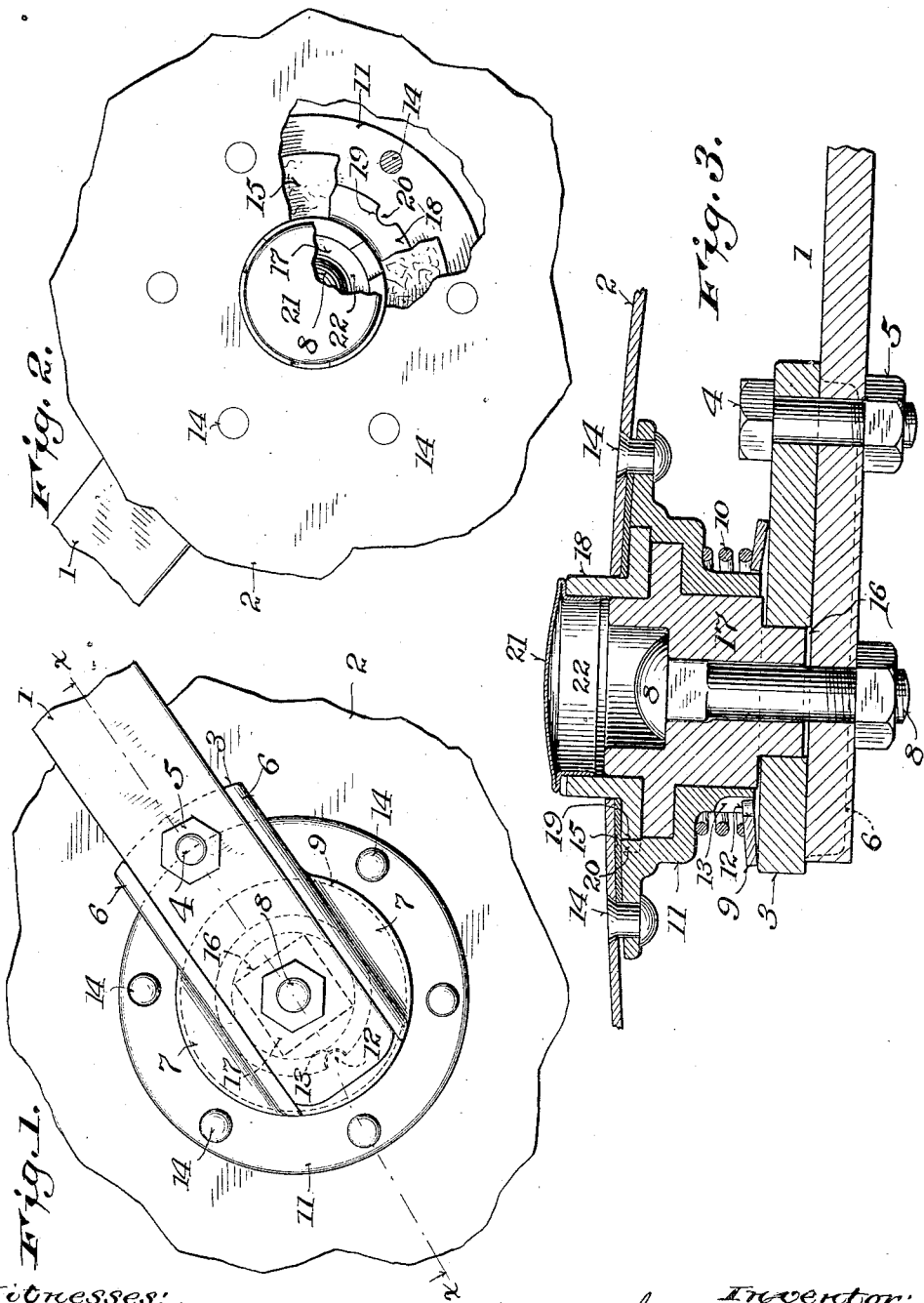

JOSEPH P. OFFERMAN, OF BEAVER DAM, WISCONSIN.

DUST-PROOF JOURNAL-BEARING.

1,131,857. Specification of Letters Patent. Patented Mar. 16, 1915.

Application filed March 11, 1914. Serial No. 823,851.

*To all whom it may concern:*

Be it known that I, JOSEPH P. OFFERMAN, a citizen of the United States, residing at Beaver Dam, county of Dodge, and State of Wisconsin, have invented new and useful Improvements in Dust-Proof Journal-Bearings, of which the following is a specification.

My invention relates to improvements in dust proof journal bearings, and it pertains more especially to that class of bearings which are used for revolubly connecting metallic disks with seeders, harrows and the like.

The primary object of my invention is to provide a simple and efficient bearing from which dust and other gritty substances will be effectually excluded.

My invention is further explained by reference to the accompanying drawings in which—

Figure 1 represents a rear view. Fig. 2 represents a front view, and Fig. 3 a section drawn on line $x$—$x$ of Fig. 1, a portion of said disk being broken away in all of said views.

Like parts are identified by the same reference numerals throughout the several views.

1 represents a draw bar of a seeder or a harrow to which the metallic disk 2 is attached through the mechanism hereinafter described. To one side of the draw bar 1 is attached the plate 3 by a heavy bolt 4 and nut 5 in the ordinary manner. The plate 3 is preferably made of cast metal and is provided on its respective sides with longitudinal flanges 6, 6 which are adapted to bear against the respective sides of the draw bar 1 and serve to hold said draw bar rigidly in place. The lower end of said plate 3 is provided with a circular flange 7 which is formed concentric with the disk retaining bolt 8.

The object of the flange 7 is to provide a circular bearing for the concavo-convex collar 9 and against which said collar is adapted to revolve, said collar 9 being retained at its periphery in close contact with the plate 3 by the recoil of the spiral spring 10. The spring 10 is interposed between the revoluble disk supporting hub 11 and said collar 9 and is adapted by its recoil to retain said collar in close contact with said plate 3. The collar 9 is provided with an inwardly projecting lug 12 which is adapted to engage in the concave recess 13 formed in said hub 11, whereby said collar is caused to revolve with said hub. The hub 11 is rigidly affixed to the metallic disk 2 by a plurality of rivets 14.

15 is a packing of ordinary construction which is preferably interposed between the disk 2 and hub 11 to prevent the possibility of dust entering the hub between the opposing bearings of such parts. The plate 3 is provided with an angular aperture 16 for the reception of one end of the fixed central hub 17 and said hub 17 is inserted within and inclosed by the revoluble hub 11 before said hub 11 and disk 2 are connected together.

Thus it will be obvious that when the bolt 8 is inserted, the hub 17 will be rigidly retained in place and serves as a stationary support for the revoluble hub 11 which is adapted to revolve freely around it, while the hub 17 is prevented from turning by its angular bearings within the angular aperture 16. Preparatory to attaching the disk 2 to the revoluble hub 11 by the rivets 14, said central hub 17 is first inserted therein when it is secured in place by the bolt 8. When this is done, the angular sleeve 18 is inserted. The sleeve 18 is provided with a recess 19 for the reception of the lug 20 which lug 20 is formed on the shoulder of the hub 11, whereby said angular sleeve 18, disk 2 and hub 11 are all caused to revolve together around and upon the fixed hub 17. 21 is a dust cap which has dust tight bearings within the sleeve 18. The dust cap 21 is preferably made of resilient metal and is adapted to closely fit the interior wall of said sleeve and the same may be removed for the purpose of inserting a lubricant in the chamber 22 which chamber is formed between the protruding sides of the sleeve 18 and said dust cap 21.

It will now be understood that when the seeder or harrow is being drawn forwardly by the draw bar 1, said disk 2 and the parts rigidly connected therewith will be revolved together upon the fixed hub 17 and that a lubricant placed in the chamber 22 can only escape therefrom outwardly past the collar 9, whereby such dust, if any, as might possibly enter between such collar 9 and the plate 3 will be conveyed outwardly by the escaping lubricant.

Having thus described my invention, what I claim as new, and desire to secure by Letters Patent, is—

1. In a device of the described class, the combination of a revoluble disk provided with a central aperture, an annular sleeve located in said aperture, a revoluble hub rigidly affixed to said disk, a stationary hub centrally located in said revoluble hub, said central hub being provided with a central bolt receiving aperture, and an angular projection, a bolt located in the central aperture of said fixed hub and a fastening plate provided with an angular aperture for the reception of the angular projection on said fixed central hub.

2. In a device of the described class, the combination of a revoluble disk provided with a central aperture, an annular sleeve located in said aperture, a revoluble hub rigidly affixed to said disk, a stationary hub centrally located in said revoluble hub, said central hub being provided with a central bolt receiving aperture and an angular projection, a bolt located in the central aperture of said fixed hub a fastening plate provided with an angular aperture for the reception of the angular projection on said fixed central hub, and a removable cap located in and adapted to close the aperture in said sleeve above said bolt.

3. In a device of the described class, the combination of a revoluble disk provided with a central aperture, an annular sleeve located in said aperture, a revoluble hub rigidly affixed to said disk, a stationary hub centrally located in said revoluble hub, said central hub being provided with a central bolt receiving aperture and an angular projection, a bolt located in the central aperture of said fixed hub, a fastening plate provided with an angular aperture for the reception of the angular projection on said fixed central hub, a removable cap located in and adapted to close the aperture in said sleeve above said bolt, and a concavo-convex dust excluding collar inclosing the inner end of said revoluble hub, a spiral spring interposed between said revoluble hub and said collar, said spring being adapted by its recoil to retain said collar in close contact with the opposing plate.

4. In a device of the described class, the combination of a revoluble disk provided with a central aperture, an annular sleeve located in said aperture, a revoluble hub rigidly affixed to said disk, a stationary hub centrally located in said revoluble hub, said central hub being provided with a central bolt receiving aperture and an angular projection, a bolt located in the central aperture of said fixed hub, a fastening plate provided with an angular aperture for the reception of the angular projection on said fixed central hub, a removable cap located in and adapted to close the aperture in said sleeve above said bolt, a concavo-convex dust excluding collar inclosing the inner end of said revoluble hub, a spiral spring interposed between said revoluble hub and said collar, said spring being adapted by its recoil to retain said collar in close contact with the opposing plate, and means for revolubly connecting said collar with said revoluble hub.

Signed at Milwaukee, Wisconsin, this 10th day of December, 1914.

In testimony whereof I affix my signature in the presence of two witnesses.

JOSEPH P. OFFERMAN.

Witnesses:
W. E. POMEROY,
JAMES T. HEALY.

Copies of this patent may be obtained for five cents each, by addressing the "Commissioner of Patents, Washington, D. C."